United States Patent
Pestl (10) Patent No.: US 6,743,020 B2
(45) Date of Patent: Jun. 1, 2004

(54) CARD FOR REPRESENTING COLOR APPLIED TO FACIAL FEATURES

(76) Inventor: Marcus G. Pestl, P.O. Box 1481, Addison, TX (US) 75001-1481

( * ) Notice: Subject to any disclaimer, the term of this patent is extended or adjusted under 35 U.S.C. 154(b) by 0 days.

(21) Appl. No.: 10/140,400

(22) Filed: May 6, 2002

(65) Prior Publication Data

US 2003/0207236 A1 Nov. 6, 2003

(51) Int. Cl.⁷ ............................................. G09B 19/00
(52) U.S. Cl. ........................... 434/100; 434/81; 434/98
(58) Field of Search ............................. 434/81, 96, 97, 434/98, 99, 100, 101, 102, 104

(56) References Cited

U.S. PATENT DOCUMENTS

| | | |
|---|---|---|
| 845,798 A | 3/1907 | Lehr |
| 1,960,669 A | 5/1934 | Freedman |
| 1,979,119 A | 10/1934 | Radzinsky |
| 2,088,076 A | 7/1937 | Winslow |
| 2,168,352 A | 8/1939 | Lawry |
| 2,257,981 A | 10/1941 | Scott |
| 2,293,271 A | 8/1942 | von Knauf |
| 2,297,282 A * | 9/1942 | Belden .......................... 434/99 |
| 2,499,450 A * | 3/1950 | Bergman ....................... 434/99 |
| 2,623,304 A | 12/1952 | Watson |
| 3,325,917 A | 6/1967 | Kinnaman |
| 3,353,281 A | 11/1967 | Schulze |
| 3,596,390 A * | 8/1971 | Scalice .......................... 40/491 |
| 3,809,785 A * | 5/1974 | Calabrese et al. ............. 434/100 |
| 4,043,056 A * | 8/1977 | Savage .......................... 434/96 |
| 4,047,307 A | 9/1977 | Quinn, III |
| 4,226,030 A | 10/1980 | Quinn, III |
| 4,232,334 A | 11/1980 | Dyson |
| 4,561,850 A * | 12/1985 | Fabbri et al. .................. 434/98 |
| 4,676,753 A | 6/1987 | Haggas |
| 4,979,324 A * | 12/1990 | Rehtmeyer et al. ........... 40/490 |
| 5,178,169 A * | 1/1993 | Lamle ........................... 132/319 |
| 5,192,209 A * | 3/1993 | Sweet ............................ 434/98 |
| 5,441,412 A | 8/1995 | Hayles |
| 5,860,809 A * | 1/1999 | Meehan ......................... 434/100 |
| 5,897,416 A * | 4/1999 | Barrows ........................ 446/147 |
| 5,909,910 A * | 6/1999 | Shaffer .......................... 434/82 |
| 6,000,407 A * | 12/1999 | Galazin ......................... 132/200 |

* cited by examiner

Primary Examiner—Kurt Fernstrom (57) ABSTRACT

A thin, skin-toned pocketed card having two layers of material. The foreground layer of this card is made of a thin transparent material that is printed with images of facial features. To print these images, color is applied to the material starting at the boundary of the image and extending out onto the surrounding material. The transparent portion, not the colored portion of the material, hence defines these images. The background layer of material is uniformly colored to match the foreground layer. When the foreground layer is positioned over the background layer the images of facial features become indistinguishable from the background. The layers are then joined to each other so that open pockets are formed between their adjacent surfaces, and so that one set of facial features is allocated to each pocket. Uniformly sized strips of colored media representing cosmetic colors are inserted into the open pockets. When the foreground is viewed a colored area of the color strip is visible through the transparent facial image of the pocket in which it is located. This transparent area represents a facial feature, hence the facial feature appears to be colored with cosmetic color.

20 Claims, 11 Drawing Sheets

CARD FOR REPRESENTING COLOR APPLIED TO FACIAL FEATURES

CROSS-REFERENCE TO RELATED APPLICATIONS

Not applicable

BACKGROUND

1. Field of Invention

This invention relates to self-selection of complementary cosmetic colors, specifically to the effect of color combinations shown against an individual's skin tone.

2. Description of Prior Art

The commercial advantage of aiding consumers in the selection of color cosmetics has long been recognized. Several types of inventions have been created to aid choice and demonstrate use of color cosmetic products.

Many of these inventions lack portability, and cannot be distributed easily. The cost or size of some such inventions may limit their wide adoption. Some may have a cost disproportionate to the increased sales they generate. Almost all take a rudimentary view of color application by omitting the nuances of skin and hair texture. Others lack clarity of use, a clearly defined result, or require the presence of a trained operator.

Many consumers want to select color for a specific combination of their facial features. However, most such inventions are inflexible in this regard. Some such inventions additionally require the selection of a facial profile, complicating their use. Lastly, many such inventions do not account for the user's skin tone.

U.S. Pat. No. 5,441,412 to Hayles (1995) shows a kit of multiple overlays of clear film. These overlays are assembled one on top of the other. When correctly located these overlays portray color applied to a base image of facial features. It should be noted that the purpose of the kit is primarily instructional.

Despite being of clear material, the successive overlaying could obscure and alter color on the lower layers of film. The same would apply to the base image of the user's face, if it were colored in her skin tone. The visual depth of the resulting image would also be inconsistent. Subsequently the kit would be limited in how well it could selectively represent facial features colored against a users skin tone.

There is also no clear indication of how the overlays would be positioned accurately one on top of the other. Without such a feature it might be difficult to align the overlays to create a coherent image. The resulting image might appear misregistered or blurry, like an color image printed on a press where the plates are out of alignment.

A further limitation of the invention is that, depending on its customized nature, a user may not easily choose an overlay from another user's kit.

U.S. Pat. No. 2,623,304 to Watson (1952) shows a chart with lip-shaped openings into which strips of colored media are inserted. Light passes through the media to simulate the appearance of color cosmetics applied to a specific skin tone. This characteristic, it is argued, better shows the semi-transparent nature of cosmetics when applied.

Color cosmetics have an infinite array of effects when applied due to different ingredients used in their formulation. This invention does not describe how such different effects might also be simulated. Some of these different effects include pearlescent, matte, gloss and metallic sheens. There is also evidence that many consumers want rich, thicker, and longer-lasting cosmetic color application. Thus this invention may not be applicable for simulating vibrant, richer cosmetic colors.

When openings are used as windows through which color is viewed, there is a transition in surfaces. This transition is not only rudimentary, but interrupts the visual flow otherwise afforded when the viewed surface is continuous.

Simulating applied cosmetic color necessitates simulating the natural texture of skin and facial features. This natural texture produces variations in color and depth. This invention does not describe how such natural texture is shown. In addition, there are many cosmetic application techniques and product consistencies. Some cosmetic products are designed for application with a defined edge. Other cosmetic products are designed to blend into the surrounding skin. Using unsophisticated cut outs to show facial features without natural texture cannot properly simulate applied cosmetic color.

Several inventions have been proposed which use reflection or projection of light to simulate the effect of cosmetic color on individual facial features. For example U.S. Pat. Nos. 2,293,271 to Von Knauf (1942); 2,257,981 to Scott (1941); 2,168,352 to Lawry (1939); 1,979,119 to Radzinsky (1934), and 1,960,669 to Freedman (1934). These inventions all suffer from some of the disadvantages already outlined. They may use projected light that cannot account for special sheens of cosmetic preparations. They may require the user to hold very still or exert significant concentration.

A major disadvantage of most such inventions is a failure to represent facial features in their pleasing natural arrangement. In fact, most might even cause a grotesque image of the facial features to result. For example, such inventions describing a mirror place the colored facial feature at a different visual depth to the user's face. This would mean the feature would be out of focus while the face was in focus. This is hardly an ideal way to visualize color applied to one's facial features. It could even result in the user seeing a third eye in the center of her forehead. Staring at a spot on a mirror illustrates the concept vividly.

None of these inventions can easily show eyelid color because one's own eyelids are not easily seen. Many also do not allow the user to selectively view color on one or more facial features of her choice. The features to be colored are often described as single or in predetermined combinations. Some such inventions are simply out-dated and could no longer entice consumers who have become more sophisticated. U.S. Pat. No. 2,088,076 to Winslow (1937) shows a pair of cut out paper lips affixed to an image of a face. Whilst deemed novel in 1937, such a marketing display might well provoke amusement today.

U.S. Pat. No. 4,232,334 to Dyson (1980) describes a device to produce an image of a made-up face. However, the image is immutable and prevents color experimentation. For example, you could not change the lip color when you arrived at home. The apparatus also requires operation by a trained operator, and a significant consumer time commitment.

Not all prior art examples relate to the application of cosmetic color. U.S. Pat. No. 4,043,056 to Savage (1977) describes a game to make a face from inserts. It is designed to be both challenging and enjoyable. However, this invention does not attempt to accentuate natural beauty by applying cosmetic color. Nor is it designed to aid in color cosmetic selection and use.

U.S. Pat. No. 3,353,281 to Schulze (1967); U.S. Pat. No. 4,226,030 to Quinn (1980); and U.S. Pat. No. 4,676,753 to Haggas (1987) describe subject identification kits. The images of facial features and characteristics are carried on leaves, or overlays. These leaves or overlays variously slide, clip or lay in position. All of these inventions are designed to produce an easily distributed likeness of an individual. Their purpose is not to represent skin tone or cosmetic color applied to facial features.

SUMMARY

In accordance with the present invention a skin-toned pocketed card capable of portraying color applied to facial features. Insertion of color strips simulates cosmetic color applied to the user's facial features.

Objects and Advantages

Accordingly, several objects and advantages of my invention are as follows:

(a) to provide a pocketed card capable of portraying color applied to facial features which is highly portable, and can be distributed easily.

(b) to provide a pocketed card capable of portraying color applied to facial features which has a very low unit cost.

(c) to provide a pocketed card capable of portraying color applied to facial features which can be operated intuitively by a single user.

(d) to provide a pocketed card capable of portraying color applied to any chosen combination of facial features.

(e) to provide a pocketed card capable of portraying color applied to facial features which does not require the selection of a facial profile.

(f) to provide a pocketed card capable of portraying color applied to facial features which accounts for the user's skin tone.

(g) to provide a pocketed card capable of portraying color applied to facial features using easily located color strips.

(h) to provide a pocketed card capable of portraying color applied to facial features where successive overlaying will not obscure and alter color or skin tone.

(i) to provide a pocketed card capable of portraying color applied to facial features where all visual elements can simultaneously be viewed in focus.

(j) to provide a pocketed card capable of portraying color applied to facial features which will not be subject to misalignment of components.

(k) to provide a pocketed card capable of portraying color applied to facial features whose use will not be hindered by user customization.

(l) to provide a pocketed card capable of portraying color applied to facial features which will display accurately the various sheens of cosmetic formulations.

(m) to provide a pocketed card capable of portraying color applied to facial features which simulates the natural texture of skin and facial features.

(n) to provide a pocketed card capable of portraying color applied to facial features which does not require the user to hold very still or exert significant concentration.

(o) to provide a pocketed card capable of portraying color applied to facial features including closed eyelids.

(p) to provide a pocketed card capable of portraying color applied to facial features which offers the benefit of easily interchanging colors.

(q) to provide a pocketed card offering a continuous, uninterrupted surface upon which the application of color is viewed.

(r) to provide a pocketed card able to portray the degree to which a cosmetic color will remain defined or will blend into the surrounding skin.

Further objects and advantages of my invention will become apparent from a consideration of the drawings and ensuing description.

DRAWING FIGURES

In the drawings, closely related figures have the same number but different suffixes.

REFERENCE NUMERALS IN DRAWINGS

| | |
|---|---|
| 10 | layer of paper card |
| 12 | polyester film lamination |
| 14 | diecut shape |
| 16 | background surface color design |
| 18 | heat-seal join |
| 20 | overlay of transparent material |
| 22 | color design on transparent material |
| 24 | heat-seal edge join |
| 26 | cavities open at one end |
| 28 | color strip |
| 30 | color strip shade and color design |
| 32 | facial features-eyes |
| 34 | facial features-eyelashes |
| 36 | facial features-cheeks |
| 38 | facial features-lips |
| 40 | perforations |
| 42 | holes |
| 44 | sheet of color strips |

DESCRIPTION

FIGS. 1A, 1B, 1C, 1D, 1E, 1F and 1G—Preferred Embodiment

Figure 1A:
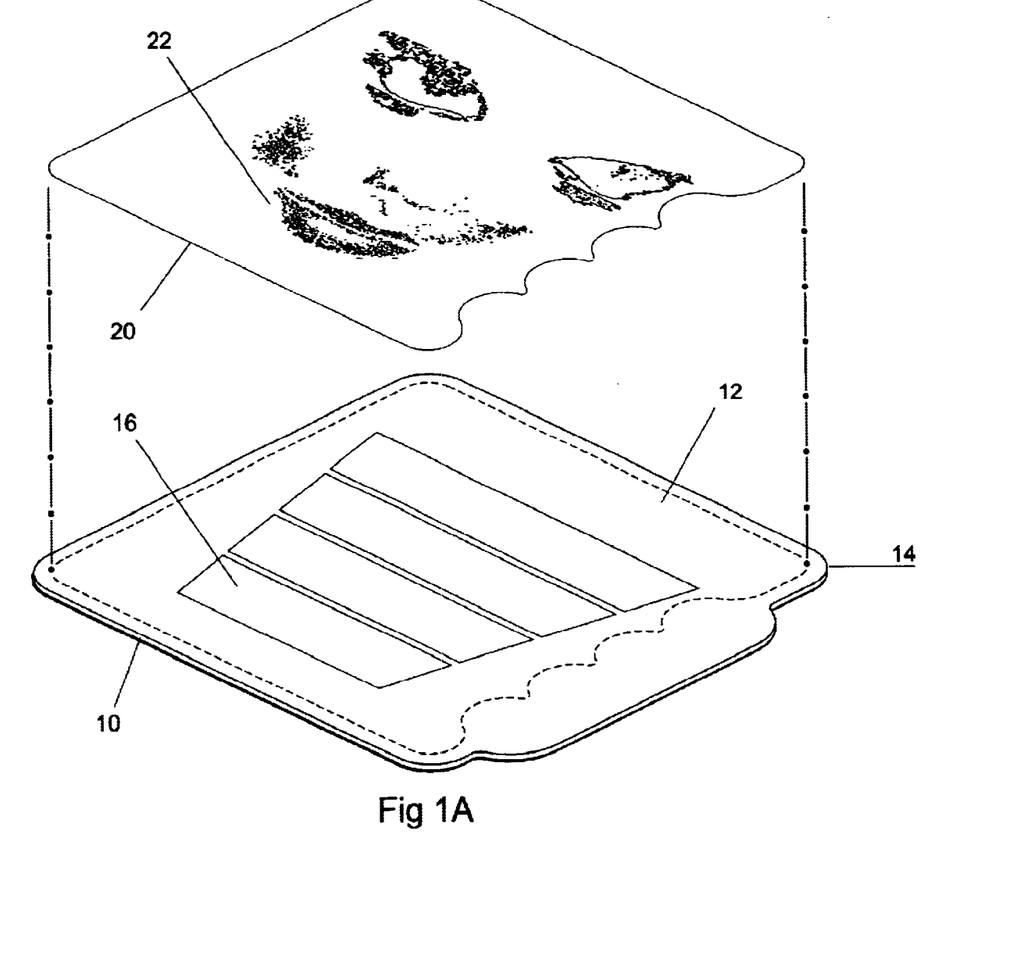
FIG. 1A shows an exploded perspective view of a skin-toned card.

A preferred embodiment of the skin-toned card of the present invention is illustrated in FIG. 1A (exploded perspective view). The skin-toned card has a base layer of paper card 10 of uniform cross section. In the preferred embodiment the base layer comprises paper card however the base layer can consist of any material to which a polyester film can be laminated, such as polyester, nylon, rubber, various laminated or impregnated fibrous materials, various plasticized materials, cardboard, paper, etc. A layer of film 12 consisting of polyester is laminated to one side of paper card 10. In the preferred embodiment, the film 12 is a polyester film, however the polyester film 12 can consist of any material which can be laminated to the paper card 10 such as Mylar, nylon, various other synthetic materials, etc. After the polyester film 12 is laminated to the paper card 10 the assembled lamination is diecut as illustrated by the diecut shape 14.

On the surface of the polyester film 12 is printed a color design 16 in skin-toned ink. In the preferred embodiment the ink is formulated to adhere to polyester, however the ink may consist of any ink that will provide uniform coverage on a synthetic film. In the preferred embodiment the color design 16 is deposited on the polyester film 12 by a flexographic printing process. However, the color design 16 may be formed by any print, electrostatic, paint or other method of depositing or printing color.

A further component of the present invention is an overlay of transparent material 20 consisting of polyester. In the preferred embodiment, the transparent material 20 is a polyester film, however the overlay of transparent material 20 can consist of any material which can be heat-sealed to the polyester film 12 such as Mylar, nylon, various other synthetic materials, etc. The underside of the transparent material 20 is printed with a color design 22 in skin-toned ink. Portions of this color design 22 are omitted and such omitted potions remain transparent and represent facial features and characteristics. In the preferred embodiment the ink is formulated to adhere to polyester, however the ink may consist of any ink that will provide uniform coverage on a synthetic film. In the preferred embodiment depositing ink on the predetermined areas of the transparent material 20 using a flexographic printing process forms the color design 22. However, such predetermined areas of the transparent material 20 may be colored by any print, electrostatic, paint or other method of depositing or printing color.

Figure 1B:
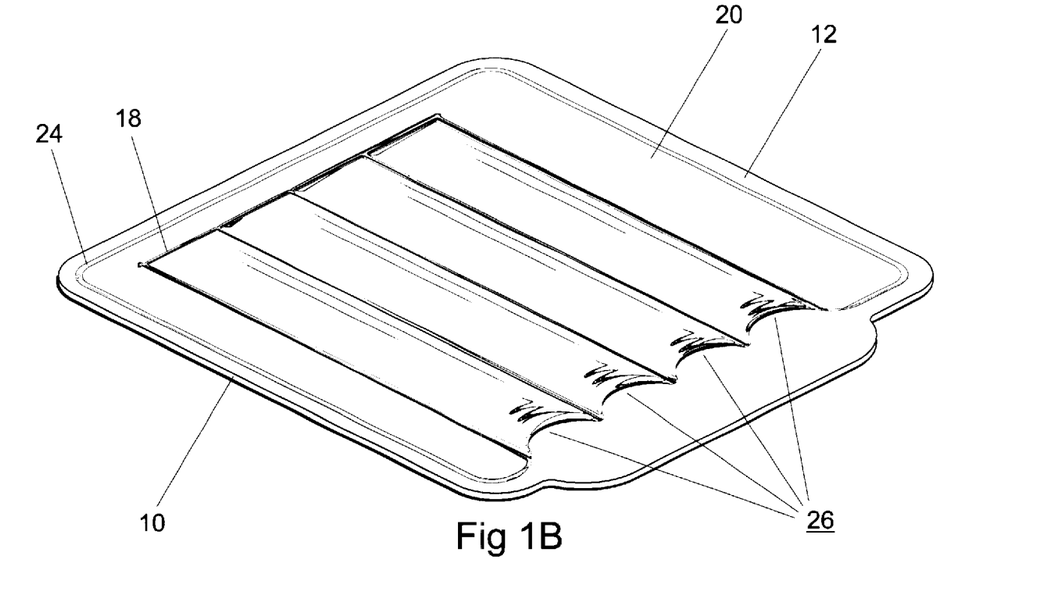
FIG. 1B shows a perspective view of a skin-toned card supplied with various parallel sealing joins traversed at one end by one perpendicular sealing join.
Figure 1C:
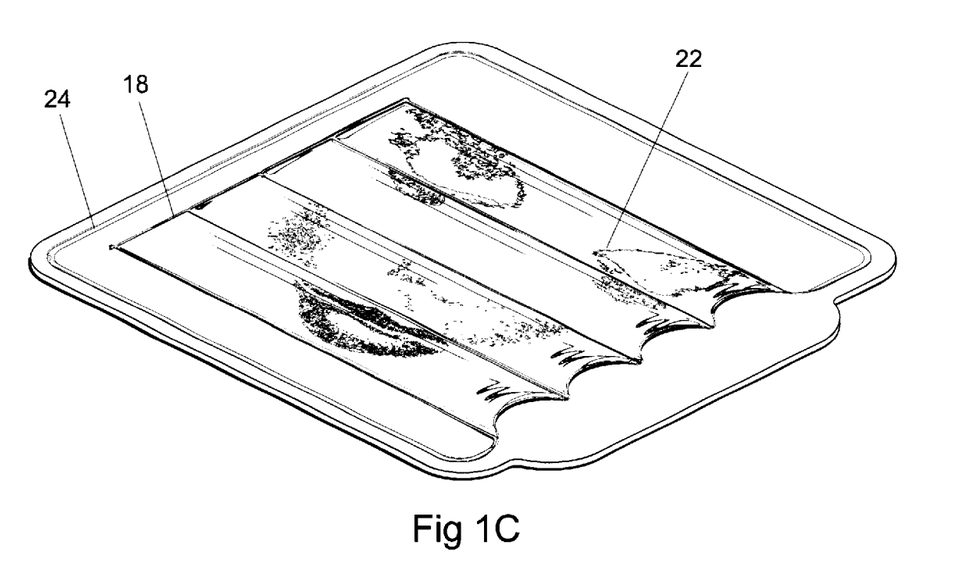
FIG. 1C shows a perspective view of a skin-toned card with images of facial features and characteristics.

FIG. 1B (perspective view) shows the final location of the transparent material 20 on the paper card 10. The transparent material 20 is joined to the polyester film lamination 12 by forming a heat-seal edge join 24 at three straight edges and four corners of the transparent material 20. An additional heat-seal join 18 consisting of five parallel lines joined at one end by a perpendicular line is applied to the surface of the transparent material 20. The effect of the heat-seal join 18 is to form cavities 26 each open at one end between the transparent material 20 and the polyester film lamination 12 laminated to the surface of the paper card 10. Since the color design 16 of the polyester film lamination 12 is of the same color as the color design 22 of the transparent material 20, no visual contrast exists between the color design 16 and color design 22. Without such visual contrast, the omitted portions of the color design 22, when laid over the color design 16 as shown in FIG. 1B, become imperceptible to the eye. FIG. 1C shows a perspective view of a skin-toned card with a color design 22 representing images of facial features and characteristics. The position of each set of facial features and characteristics of the color design 22 is shown relative to the location of the heat-seal join 18.

Figure 1D:
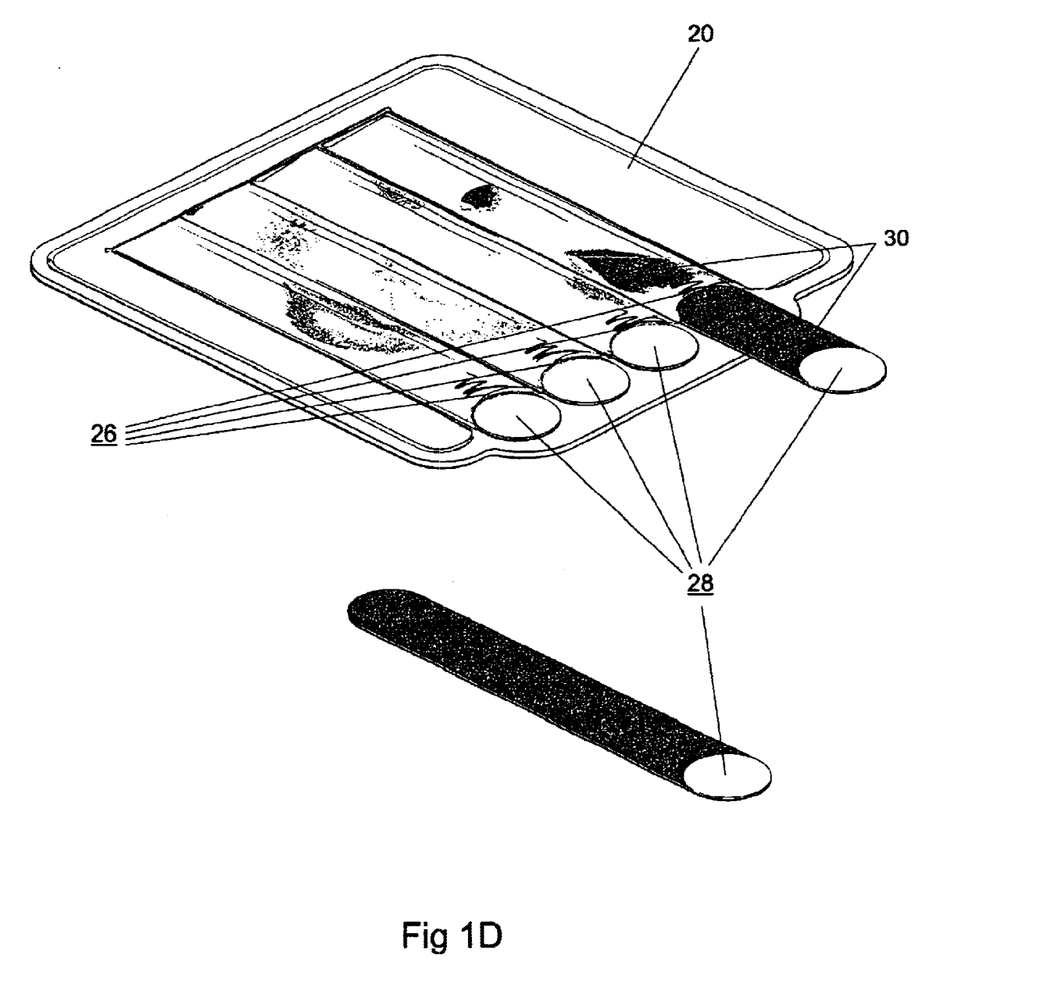
FIG. 1D shows a perspective view of a skin-toned card into which color strips are being inserted.
Figure 1E:
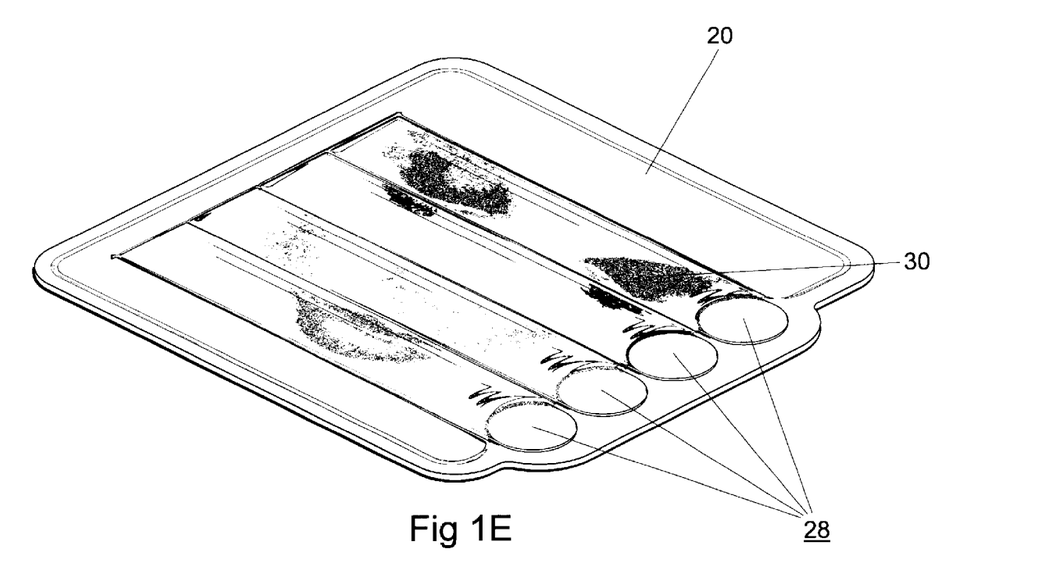
FIG. 1E shows a perspective view of a skin-toned card into which color strips have been fully inserted.

FIG. 1D shows a perspective view of a skin-toned card with a color strip 28 fully or partially inserted into each of the cavities 26. In the preferred embodiment each color strip 28 consists of a thin paper card base of uniform cross section. However the color strip 28 can consist of any material which can be printed or colored, such as polyester, nylon, rubber, various laminated or impregnated fibrous materials, various plasticized materials, cardboard, paper, etc. If fully or partially inserted into any one of the cavities 26 any portion of the color strip shade and color design 30 is visible through the transparent portions of the transparent material 20. FIG. 1E shows a perspective view of a skin-toned card with a color strip 28 fully inserted into each of the cavities 26. A portion of the color strip shade and color design 30 is visible through the transparent areas of the transparent material 20 that have been omitted from the color design 22.

Figure 1F:
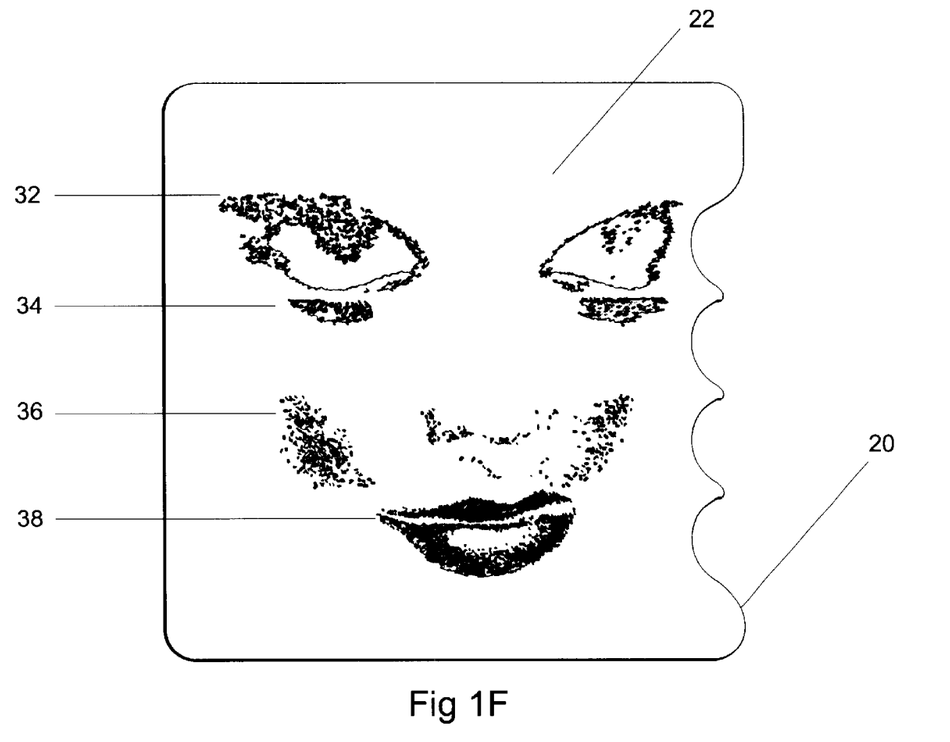
FIG. 1F shows transparent shapes and features formed by coloring an overlay of transparent material with a skin-toned ink.
Figure 1G:
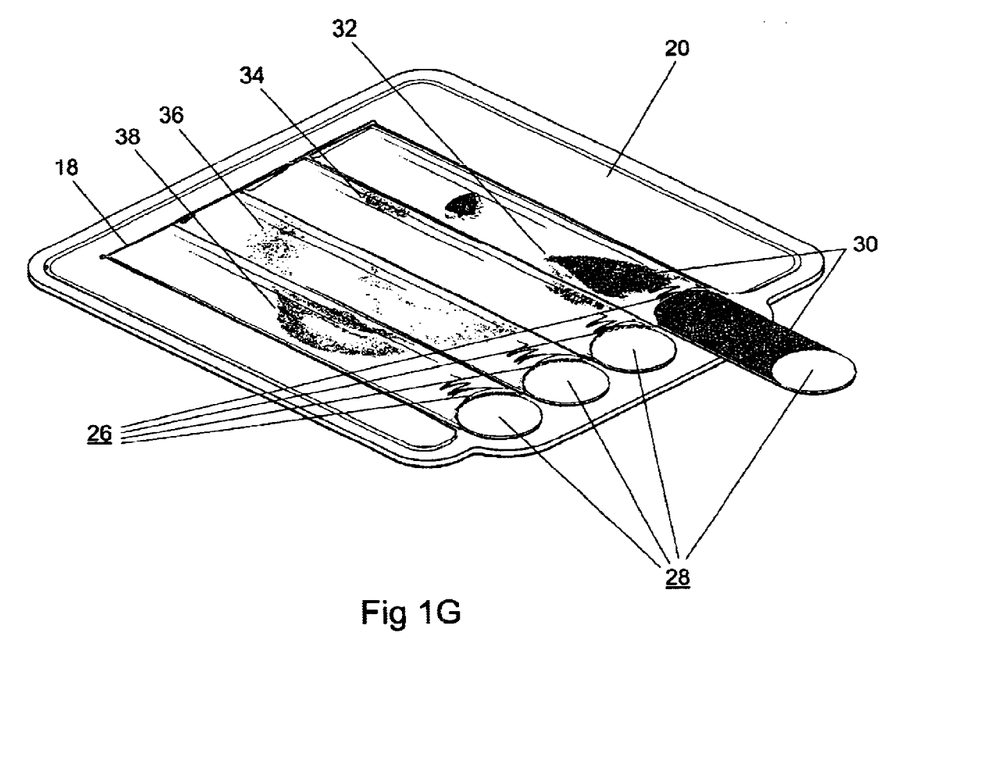
FIG. 1G shows a perspective view of a skin-toned card with images of facial features and characteristics located between parallel sealing joins.

FIG. 1F shows a plan view of the color design 22 formed by depositing skin-toned ink to the underside of the transparent material. The areas of the transparent material 20 showing the facial features and characteristics 32, 34, 38, 38 remain free of ink. Ink is deposited around these areas to allow transparent areas of material 20 showing facial features and characteristics. FIG. 1G shows a perspective view of a skin-toned card with images of facial features and characteristics located between parallel sealing joins of heat-seal join 18. In the preferred embodiment the cavities 26 created by the heat-seal join 18 are each of uniform internal width and length. In the preferred embodiment each color strip 28 is of uniform size allowing insertion of its length into each of the cavities 26. The internal length of the cavities 26 extends from the cavity opening to the perpendicular line of the heat-seal join 18. The internal width of the cavities is equal to the distance between the closest edges of adjacent parallel lines of the heat-seal join 18. This permits any color strip 28 to be inserted into each and any of the cavities 26.

FIGS. 4–7—Additional Embodiments

Figure 2:
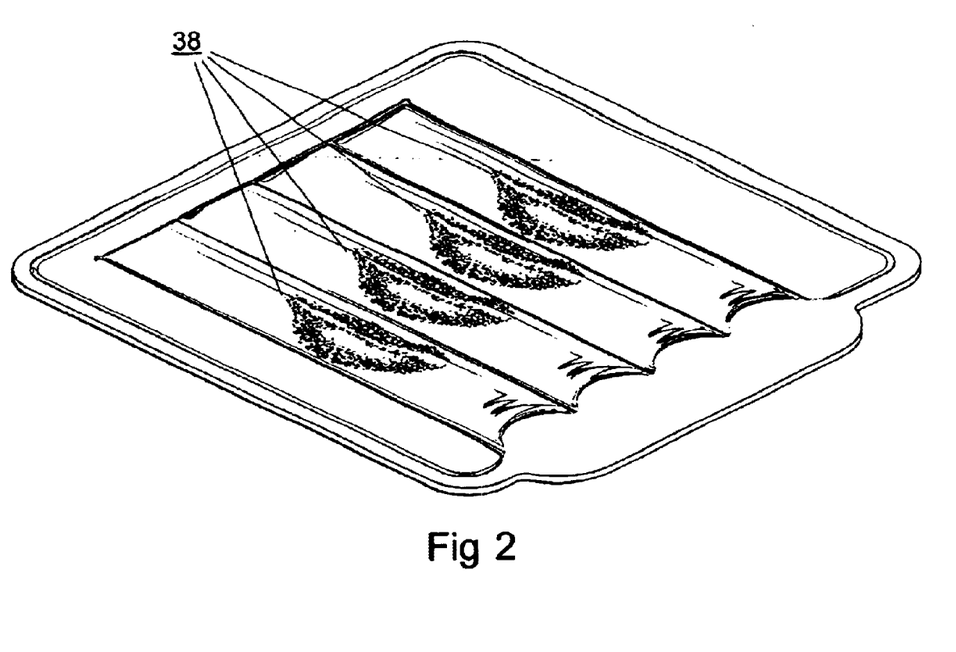
FIG. 2 shows a perspective view of a pocketed card with four repeating images of lips.
Figure 3:
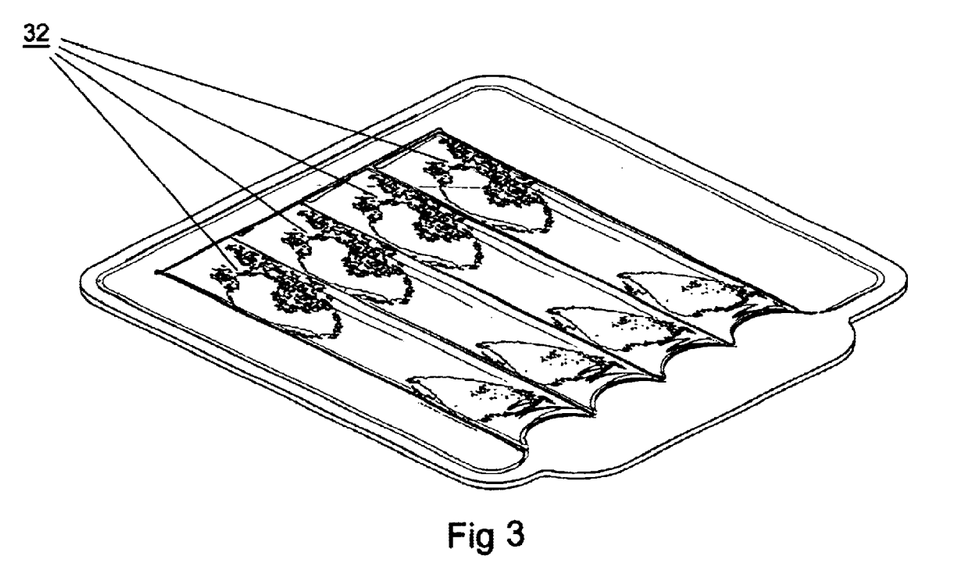
FIG. 3 shows a perspective view of a pocketed card with repeating images of four pairs of eyelids.
Figure 4:
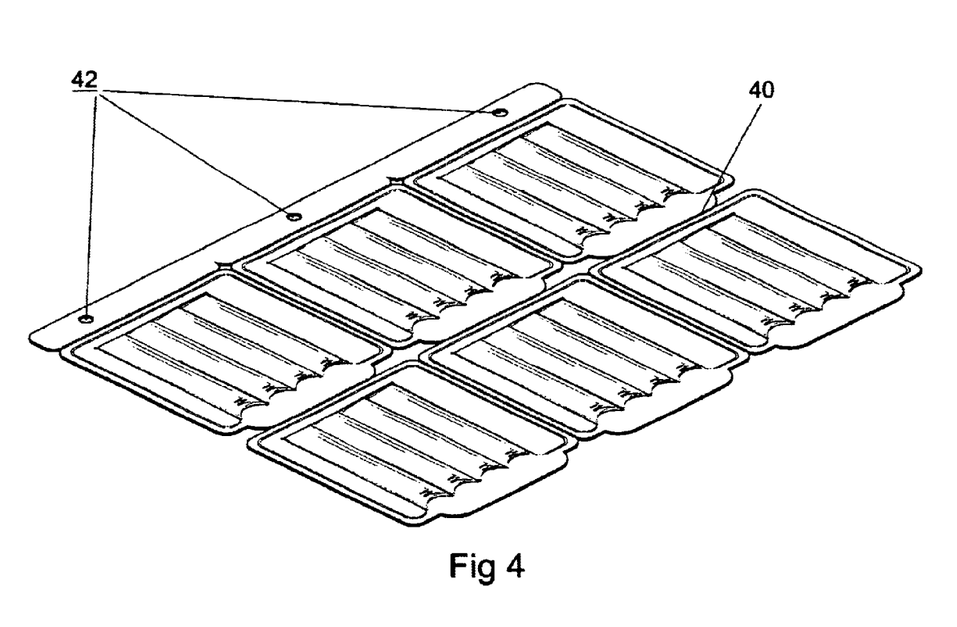
FIG. 4 shows a perspective view of a sheet of pocketed cards with perforations to allow separation.
Figure 5:
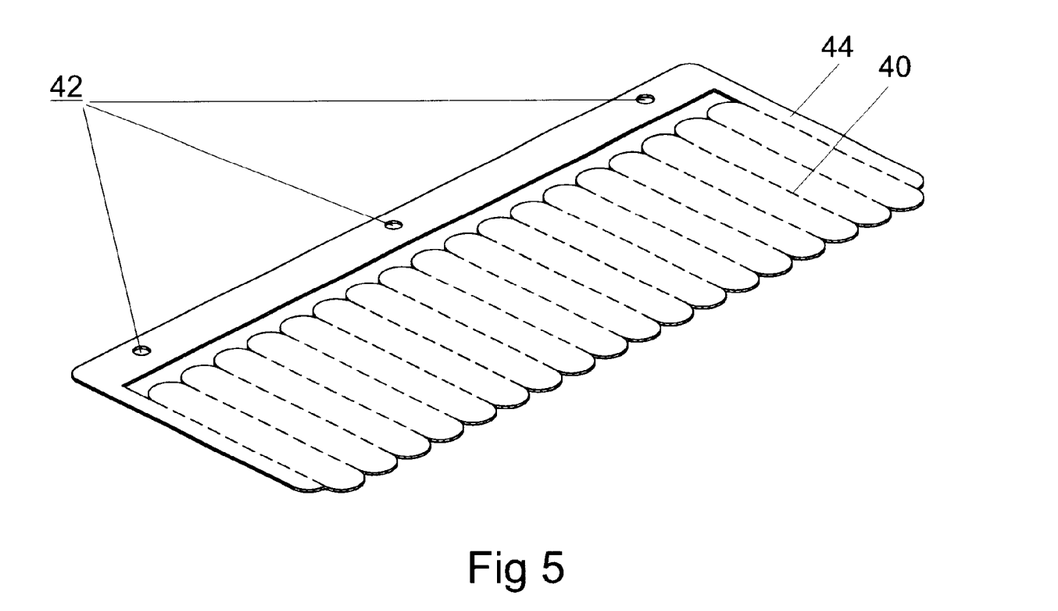
FIG. 5 shows a perspective view of a sheet of color strips with perforations to allow separation.

Additional embodiments are shown in FIGS. 2, 3, and 4. In each case the arrangement of facial features and characteristics is shown. In FIG. 2 a pocketed card similar to the present invention with 4 lips 38 is shown. In FIG. 3 a pocketed card similar to the present invention with 4 pairs of eyelids 32 is shown. In FIG. 4 sheet of pocketed cards similar to the present invention with perforations 40 to allow easy separation is shown. The sheet of pocketed cards shown in FIG. 4 also has holes 42 to allow for binder storage. FIG. 5 shows a sheet of color strips 44 similar to the color strip 28 of the present invention, with perforations 40 to allow manual separation and holes 42 to allow for binder storage.

Advantages

From the description above, a number of advantages of my pocketed card and color strips become evident:

(a) The flat pocketed cards and color strips can be produced individually or in perforated sheet form. This will allow easy packaging, mass distribution, and easy storage of single or multiple units.

(b) The nature of the printed and laminated construction ensures a low unit cost for each pocketed card and color strip. The materials and processes used are common to the printing industry.

(c) The simple use nature of the pocketed card and color strips requires little, if any, instruction. The underside of the card substrate provides an additional surface for printed information. Any individual user will intuitively understand the pocketed card's operation and use.

(d) The color strips can be inserted into any combination of pockets to reveal color applied to the selected facial features. In this way color applied to eyes only may be viewed; or color applied to both lips and eyes may be viewed. If a pocket does not have a color strip inserted into it the facial features located on that pocket remain invisible. In this way, if the user wishes only to view a lip color, no distracting images of colorless facial features will be noticed.

(e) The user is not required to select a facial shape or profile in order to view color applied to the facial features.

Excluding the facial shape removes a complicating step and emphasizes the selection of color cosmetic combinations.

(f) The inks used to color the film portions of the card will be skin-toned. It is possible to use inks corresponding from very dark through to very fair skin tones. In a commercial application the range of ink colors used might correspond to a cosmetic company's range of foundation colors. In this way a user would select a card whose color matches the foundation product she uses.

(g) The color strips are sized to fit easily into pockets of uniform size. There is no possibility of incorrect insertion or misalignment of the color strip. Inserting a color strip will always produce a color effect. The strip can always be removed easily because the pocket is shorter than the strip.

(h) A color viewed through several layers of transparent film can be dulled and distorted. The color surface of the color strip is viewed through a single layer of transparent film. The skin color of the color design is also viewed through a single layer of transparent film. Subsequently, neither the color being viewed, nor the skin tone, will be dulled or distorted by successive layering of transparent films.

(i) All facial features on the card are presented at the same distance from the user's eye. The user is not required to shift focus from one feature to the other in order to view color applied to these features. Such focus adjustment would be required if the features were presented at varying focal distances from the user's eye.

(j) In the case of the preferred embodiment of the card it is not possible to adjust the alignment of the facial features. The location of facial features relative to one another is fixed. This is an advantage because the facial features cannot be overlapped or mislocated by the user.

(k) The card shows facial features which are expected. Thus the preferred embodiment of the card requires no user customization. Furthermore, there is only one user variable involved in selecting a card. The user is simply required to select from a range a card corresponding to her skin tone.

(l) In a commercial application color strips would be printed with colors closely matching a cosmetic company's color products. Many printing techniques, such as using metallic inks, can ensure the color strips also closely match mass-market cosmetic textures and finishes.

(m) The images of facial features are created by depositing ink, not formed by cut-out shapes mimicking facial features. Hence these images can be generated by using photographic images. This means the appearance of natural texture, such as lines and hairs, can be incorporated into these images. The result is a very natural appearance of the facial features portrayed.

(n) The card does not require the user to hold still or exert significant concentration to see the result of applying color. The card can be held in the hand, placed on a surface, or viewed at any angle. More than one card can be viewed at a time to compare the effect of several colors.

(o) In the preferred embodiment the full eyelid is shown. This is advantageous because it is impossible to close one's eyes and see the effect of color applied to them. In this way the card becomes a useful tool to compare the effects of different eyeshades. Such effects may not otherwise be easily seen by the user.

(p) The color strips and the pockets into which they are inserted are of equal size. This uniformity allows color strips to be readily interchanged between facial features. Under this format color strips and cards provided by assorted vendors and companies would be interchangeable.

(q) The viewing surface is flat, and uninterrupted even when color is selectively applied. Thus devoid of any cut-outs or edges it provides a superior surface for viewing color combinations.

(r) Color cosmetics will show more or less edge definition when applied depending on their consistency. Images of facial features could thus be printed with their edges defined to a greater or lesser extent. This allows the card to show the appearance and finish of cosmetics as well as their color.

Operation—FIGS. 2A, 2B and 2C

The manner of using the pocketed card to display cosmetic color is described thus: the user selects a pocketed card, such as one from the sheet of such cards shown in FIG. 4. Her choice would be a pocketed card matching her skin tone. The user then selects one or more color strips 28. The selection of color strips 28 is entirely subjective, perhaps based on fashion, mood, likes or recommendations. The user selects a color strip 28 to be applied to a selected facial feature of her choice. She inserts the selected color strip 28 all the way in the cavity 26 corresponding to the chosen facial feature 32, 34, 36, 38.

She observes the facial feature 32, 34, 36, 38 now colored by the color strip 28. If the facial feature color is judged to complement her skin tone it may remain in the pocketed card. To remove a color strip 28 from the pocketed card she grasps the exposed end and pulls. Additional color strips 28 may be inserted into vacant cavities 26 until all cavities are filled. The user judges whether the color of the facial features 32, 34, 36, 38 is complementary, or creates the desired color effect. If so, color cosmetic product corresponding to the color strips 28 may be self-selected or otherwise selected for use.

Color strips 28 may be inserted multiple times into the cavities 26. The pocketed card and color strips 28 may be carried as a reference or discarded after cosmetic colors have been selected. Their primary purpose is to promote self-expression and confidence when choosing cosmetic color.

Conclusion, Ramifications, and Scope

Accordingly the reader will see that the pocketed card of this invention can be used to easily demonstrate cosmetic color combinations, using the user's own skin tone as a color reference. The pocketed card can be used to view the effect of cosmetic color and finish applied to one or any combination of facial features, without distorting color. The pocketed card, used in this manner, does not require user customization. In addition, operation of the pocketed card is intuitively simple and does not require instruction. Furthermore the pocketed card has the additional advantages in that     its low cost means it can be used as a promotional tool in assorted locations and in print media     it can be customized for the company which distributes it     packaged with cosmetic samplers it is potentially a low cost promotion to increase consumer awareness of new season colors     it can be used in direct sales and mail catalogs to enhance the experience of selecting color cosmetics.

Although the description above contains many specificities, these should not be construed as limiting the scope of the invention, but merely providing illustrations of some of the presently preferred embodiments of this invention. For example, the pocketed card can have other shapes, such as circular, oval, triangular, etc.; the facial features can have more or less texture, the eyelids can be shown open, eyebrows can be added, etc.

Thus the scope of the invention should be determined by the appended claims and their legal equivalents, rather than by the examples given.

I claim:

1. A device for interchanging and viewing a plurality of color designs applied to transparent shapes and features, comprising:
   (a) a sheet of material having an upper surface of a predetermined color design,
   (b) an overlay of transparent material having an underside,
   (c) means for partially coloring said overlay of transparent material with a predetermined color design such that said transparent shapes and features are defined by the non-colored transparent areas of said overlay of transparent material, and such that said predetermined color design of said transparent overlay becomes indistinguishable from said predetermined color design of said upper surface of said sheet of material,
   (d) means for fixing said underside of said overlay of transparent material to said upper surface of said sheet of material such that a plurality of cavities are formed between said upper surface of said sheet of material and said underside of said overlay of transparent material,
   (e) a plurality of color strips comprising said color designs sized to slide substantially into said plurality of cavities between said sheet of material and said overlay of transparent material,
   whereby said color designs of said sheet of material and said color strips will be visible only through said transparent areas of said overlay of transparent material.

2. The device of claim 1 wherein said sheet of material includes a layer of paper card of said predetermined color design.

3. The device of claim 2 wherein said upper surface of said sheet of material comprises a layer of polyester film laminated to said layer of paper card.

4. The device of claim 1 wherein said overlay of transparent material comprises a layer of transparent polyester film.

5. The device of claim 1 wherein said coloring of said overlay of transparent material is effected using a plurality of skin-toned inks.

6. The device of claim 1 wherein said transparent shapes and features visibly show outlines of facial features and characteristics.

7. The device of claim 6 wherein said outlines of facial features and characteristics visibly show the texture and detail of said facial features and characteristics.

8. The device of claim 1 wherein said plurality of color strips are of a uniform shape and thickness.

9. The device of claim 1 wherein said plurality of color strips comprise an upper side printed with a plurality of shades matching predetermined cosmetic colors.

10. The device of claim 1 wherein said plurality of color strips are longer than the depth of said plurality of cavities in which they may be inserted.

11. A method for interchanging and framing a plurality of color designs applied to transparent shapes and features, comprising the steps of:
    a. providing a background surface of a predetermined color design,
    b. providing a transparent overlay of identical color design modified so as to omit predetermined portions of said predetermined color design such that said predetermined portions remain transparent and reveal said transparent shapes and features,
    c. positioning said transparent overlay over said background surface such that said predetermined color design of said transparent overlay becomes indistinguishable from said predetermined color design of said background surface,
    d. providing a plurality of color strips of predetermined color designs,
    e. inserting said color strips between said background surface and said transparent overlay such that said predetermined color designs of said color strips are framed by said transparent shapes and features,
    whereby said predetermined color designs of said color strips will be visible only through said transparent shapes and features.

12. A device for concealing on a continuous surface a plurality of images whose visual characteristics are selectively shown by inserting a plurality of color strips having predetermined color shades, comprising
    (a) two sheets of transparent material,
    (b) means for forming a predetermined color design on said two sheets of transparent material such that said plurality of images are formed on one said sheet of transparent material by omitting portions of said predetermined color design,
    (c) positioning said sheet of transparent material comprising said plurality of images over other said sheet of transparent material such that said plurality of images are concealed by aligning said predetermined color design of said sheets of transparent material,
    (d) means for joining predetermined areas of adjacent surfaces of said sheets of transparent material such that open cavities are formed between said adjacent surfaces of said sheets of transparent material,
    (e) selectively inserting said plurality of color strips having said predetermined color shades into said cavities between said sheets of transparent material,
    whereby said predetermined color shades of said color strips will be visible solely through an area defined by said plurality of images beneath which said color strips are inserted.

13. The device of claim 12 wherein one said sheet of transparent material not comprising said plurality of images includes a layer of paper card.

14. The device of claim 13 wherein said layer of paper card comprises a layer of polyester film laminated to said layer of paper card.

15. The device of claim 12 wherein said predetermined color design is printed onto said polyester film using a plurality of skin-toned inks.

16. The device of claim 12 wherein said sheet of transparent material containing said plurality of images comprises a layer of transparent polyester film.

17. The device of claim 12 wherein said plurality of images visibly show the outlines and texture of facial features and characteristics.

18. The device of claim 12 wherein said plurality of color strips are of a uniform shape and thickness.

19. The device of claim 12 wherein each of said plurality of color strips comprises a layer of paper card.

20. The device of claim 19 wherein said layer of paper card includes an upper surface color printed with a plurality of shades matching cosmetic colors.

* * * * *